No. 852,592. PATENTED MAY 7, 1907.
E. L. BAUMAN.
WHIFFLETREE COUPLING.
APPLICATION FILED JAN. 15, 1907.
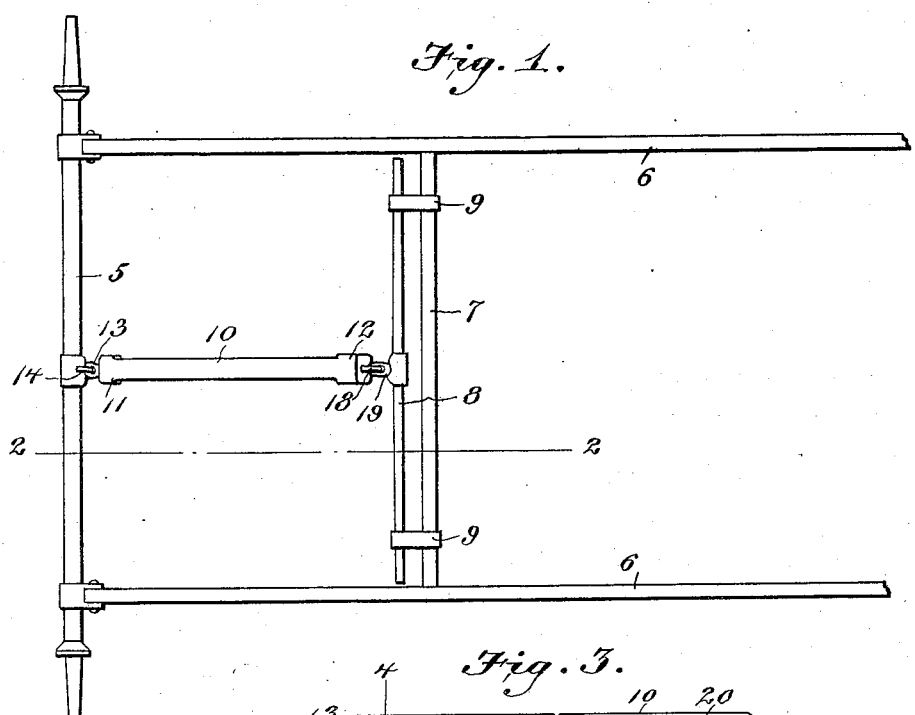
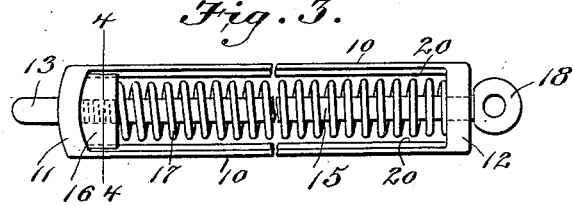
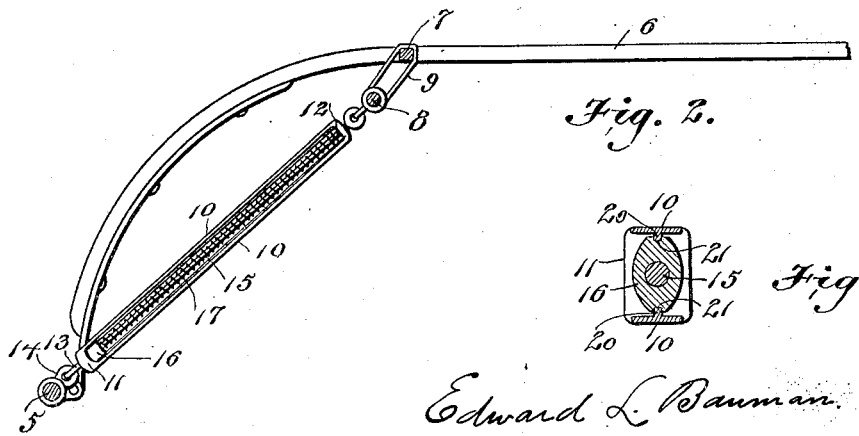
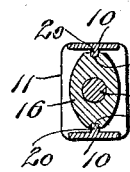
Edward L. Bauman, Inventor
Witnesses
Arthur Wesley
M. A. Schmidt
By Milo B. Stevens & Co.
Attorneys

UNITED STATES PATENT OFFICE.

EDWARD L. BAUMAN, OF SAXONBURG, PENNSYLVANIA.

WHIFFLETREE-COUPLING.

No. 852,592.  Specification of Letters Patent.  Patented May 7, 1907.

Application filed January 15, 1907. Serial No. 352,434.

*To all whom it may concern:*

Be it known that I, EDWARD L. BAUMAN, a citizen of the United States, residing at Saxonburg, in the county of Butler and State of Pennsylvania, have invented certain new and useful Improvements in Whiffletree-Couplings, of which the following is a specification.

This invention is a whiffletree coupling, and has for its object to provide an elastic connection between the axle and the whiffletree; and also to lower the draft, and to center it.

To this end, the invention consists in a construction and arrangement of parts hereinafter described and claimed, reference being had to the drawing hereto annexed in which—

Figure 1 is a plan view showing the application of the invention. Fig. 2 is a sectional view on the line 2—2 of Fig. 1. Fig. 3 is an elevation of the elastic connection. Fig. 4 is a section on the line 4—4 of Fig. 3.

Referring specifically to the drawing, 5 denotes the front axle of a vehicle; and 6, the thills which are connected by a cross-bar 7 and coupled to the axle in the usual manner. The whiffletree 8 is suspended from the cross-bar 7 by leather straps 9 which are looped around the cross-bar. The whiffletree is also coupled to the axle by an elastic connection. This connection comprises spaced parallel bars 10 which are joined at their ends by heads 11 and 12, respectively. The head 11 has an eye 13 to receive a clevis 14 for attachment to the axle. The head 12 has a central opening through which passes a draw-rod 15 threaded at its inner end to receive a nut 16 which is slidably mounted between the bars 10. A spring 17 is coiled around the rod between the head 12 and the nut 16. The outer end of the draw-rod has an eye 18 to receive a clevis 19 for attachment to the whiffletree. The movement of the nut is guided by ribs 20 on the bars 10 which enter grooves 21 on opposite sides of the nut 16.

The point of attachment of the elastic connection is at the middle of the axle and the whiffletree, which centers the draft so that the pull will be directly from the middle of the axle. The whiffletree is located a short distance below the cross-bar 7 and also a short distance to the rear thereof which lowers the draft and lightens it, and the elastic connection relieves the animal from sudden strains and shocks.

I claim:—

The combination with the axle and thills of a vehicle, and a cross-bar connecting the thills, of suspension loops depending from the cross-bar, a whiffletree carried by the loops, and an elastic connection between the whiffletree and the axle.

In testimony whereof I affix my signature, in presence of two witnesses.

EDWARD L. BAUMAN.

Witnesses:
 JOHN E. MUDER,
 W. D. HOFFMAN.